(12) United States Patent
Patterson et al.

(10) Patent No.: US 12,229,548 B1
(45) Date of Patent: Feb. 18, 2025

(54) ASSESSMENT OF DEVELOPMENT TEAM FACTORS

(71) Applicant: Wells Fargo Bank, N.A., San Francisco, CA (US)

(72) Inventors: Edward J. Patterson, Huntersville, NC (US); Matthew Thomas McDonald, Callahan, FL (US); Michael Sbandi, Harrisburg, NC (US); John Masiliunas, Indianapolis, IN (US); Richard Lee Goble, Lee's Summit, MO (US); Brian Matthew White, Charlotte, NC (US); Jerry Reynolds, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 85 days.

(21) Appl. No.: 18/156,785

(22) Filed: Jan. 19, 2023

(51) Int. Cl.
*G06Q 10/00* (2023.01)
*G06F 8/41* (2018.01)
(Continued)

(52) U.S. Cl.
CPC ............... *G06F 8/70* (2013.01); *G06F 8/443* (2013.01); *G06F 18/214* (2023.01)

(58) Field of Classification Search
CPC .......... G06F 8/70; G06F 18/214; G06F 8/443; G06F 21/53; G06F 21/577; G06F 8/20;
(Continued)

(56) References Cited

U.S. PATENT DOCUMENTS 8,117,487 B1    2/2012  Raut et al.
8,448,127 B2    5/2013  Lindley et al.
(Continued)

FOREIGN PATENT DOCUMENTS

CN    105095747 A    11/2015

OTHER PUBLICATIONS

Calcof et al., "Health modeling and observability of mission-critical workloads on Azure", Microsoft, Feb. 1, 2023, 20 pp., URL: https://learn.microsoft.com/en-us/azure/architecture/framework/mission-critical/mission-critical-health-modeling.
Cisco et al., "Cisco DNA Assurance User Guide, Release 2.1.2, Chapter 8", Cisco Systems, Inc., Nov. 6, 2020, pp. 135-154, URL: https://www.cisco.com/c/en/us/td/docs/cloud-systems-management/network-automation-and-management/dna-center-assurance/2-1-2/b_cisco_dna_assurance_2_1_2_ug.html.
(Continued)

*Primary Examiner* — Thuy Dao
(74) *Attorney, Agent, or Firm* — Shumaker & Sieffert, P.A.

(57) ABSTRACT

Techniques described herein include assessing factors that may affect the quality of software under development by a development team or that may be used to evaluate the health of software already deployed in a computing environment. In one example, this disclosure describes a method that includes collecting, by a computing system, historical information about a plurality of prior development projects; correlating, by the computing system, the historical information with each of a plurality of developers that participated in one or more of the plurality of prior development projects; collecting, by the computing system, information about an application developed by a subset of the plurality of developers; generating, by the computing system and based on the information about the application and the correlated historical information, a predicted outcome for the application; and taking an action, by the computing system and based on the predicted outcome, to prevent the predicted outcome.

18 Claims, 3 Drawing Sheets

(51) Int. Cl.
  *G06F 8/70* (2018.01)
  *G06F 9/445* (2018.01)
  *G06F 9/455* (2018.01)
  *G06F 18/214* (2023.01)
  *G06F 21/57* (2013.01)
  *G06N 20/00* (2019.01)
  *H04L 9/40* (2022.01)

(58) Field of Classification Search
  CPC ......... G06F 8/71; G06F 8/10; H04L 63/1416; H04L 63/1466; H04L 63/20; H04L 63/1433; H04L 63/1425; H04L 63/1441; G06N 20/00; G06Q 10/063118; G06Q 10/063112; G06Q 10/06; G06Q 50/01
  See application file for complete search history.

(56) References Cited

U.S. PATENT DOCUMENTS

| | | | |
|---|---|---|---|
| 8,762,188 B2 * | 6/2014 | Abercrombie | G06Q 10/04 705/7.11 |
| 8,762,987 B1 | 6/2014 | Satish | |
| 9,069,967 B2 | 6/2015 | Wysopal et al. | |
| 9,542,176 B2 | 1/2017 | Bird et al. | |
| 10,055,277 B1 | 8/2018 | Niederman et al. | |
| 11,223,637 B2 * | 1/2022 | Neuvirth | G06N 20/20 |
| 2003/0110067 A1 * | 6/2003 | Miller | G06Q 10/06 705/7.23 |
| 2008/0263507 A1 | 10/2008 | Chang et al. | |
| 2012/0317266 A1 | 12/2012 | Abbott | |
| 2018/0129483 A1 * | 5/2018 | Biddle | G06F 11/3668 |
| 2023/0376481 A1 * | 11/2023 | Mayorski | G06F 16/2448 |

OTHER PUBLICATIONS

Kraemer et al., "A Human Factors Vulnerability Evaluation Method for Computer and Information Security", Proceedings of the Human Factors and Ergonomics Society Annual Meeting, vol. 47, No. 12, Oct. 2003, pp. 1389-1393, Retrieved from the Internet on Apr. 6, 2023 from URL: https://www.researchgate.net/publication/228953472_A_Human_Factors_Vulnerability_Evaluation_Method_for_Computer_and_Information_Security.

Lange et al., "IT Benchmarking Explained: How to Assess Your IT Efforts", BMC, Apr. 5, 2021, 7 pp., URL: https://www.bmc.com/blogs/it-benchmarking-metrics/.

U.S. Appl. No. 18/163,768, filed Feb. 2, 2023, naming inventors White et al.

* cited by examiner

ASSESSMENT OF DEVELOPMENT TEAM FACTORS

TECHNICAL FIELD

This disclosure relates to computing systems, and more specifically, to techniques for evaluating factors that may affect development, operation, and/or health of an application executing within a computing environment.

BACKGROUND

The success of almost any project depends on the team responsible for the project and the environment in which the team operates. Projects implemented by teams with more competent team members can be expected to succeed more often and/or to a higher degree than projects implemented by less competent teams. Projects implemented by teams in a stable, distraction-free, and productive environment can also be expected to succeed more often and/or to a higher degree than projects implemented in less favorable environments.

These same concepts also apply to software development projects. More capable developers operating in a stable, distraction-free, and productive environment can be expected to develop software that is of higher quality and more reliable.

SUMMARY

Techniques described herein include assessing factors that may affect the quality of software under development by a development team. In some examples, such techniques include collecting information about the development team involved in a software project, and making assessments or predictions about the outcome of the project or about attributes of the software resulting from the development efforts. Techniques described herein also include collecting information about the team that developed an already-deployed application, and making an assessment or prediction about the operation, reliability, and/or health of the application.

In some cases, attributes or traits of specific developers are assessed based on historical contributions (e.g., source code written) by each developer in prior software projects or developed applications. Such historical contributions are used to evaluate the quality of the work performed by each developer, which may then be translated into a prediction about an ongoing project or an already-deployed application. Although techniques described herein are often applied to assess the health of a project or application, such techniques may be applied in other contexts.

In some examples, this disclosure describes operations performed by a computing system in accordance with one or more aspects of this disclosure. In one specific example, this disclosure describes a method comprising collecting, by a computing system, historical information about a plurality of prior development projects; correlating, by the computing system, the historical information with each of a plurality of developers that participated in one or more of the plurality of prior development projects; collecting, by the computing system, information about an application developed by a subset of the plurality of developers; generating, by the computing system and based on the information about the application and the correlated historical information, a predicted outcome for the application; and taking an action, by the computing system and based on the predicted outcome, to prevent the predicted outcome.

In another example, this disclosure describes a system comprising a storage system and processing circuitry having access to the storage system, wherein the processing circuitry is configured to carry out operations described herein. In yet another example, this disclosure describes a computer-readable storage medium comprising instructions that, when executed, configure processing circuitry of a computing system to carry out operations described herein.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
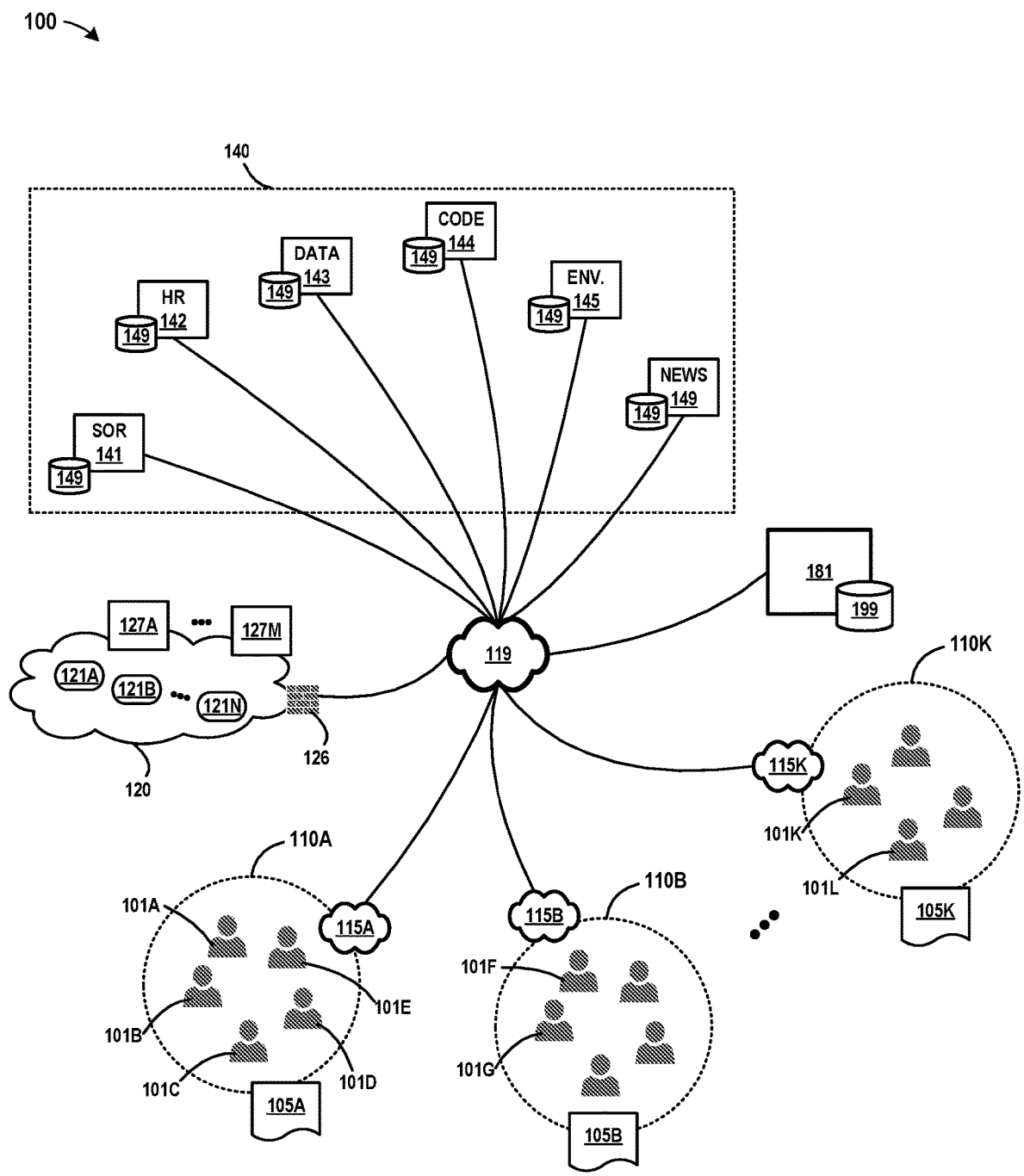
FIG. 1 is a conceptual diagram illustrating an example system that assesses factors that may affect the quality of software developed by a development team, in accordance with one or more aspects of the present disclosure.

FIG. 1 is a conceptual diagram illustrating an example system that assesses factors that may affect the quality of software developed by a development team, in accordance with one or more aspects of the present disclosure. Illustrated in FIG. 1 are teams 110A, 110B, through 110K (collectively, "teams 110"). Each of teams 110 include a subset of developers 101. For example, developers 101A, 101B, 101C, 101D, and 101E are illustrated as being members of team 110A. Similarly, developers 101F and 101G are illustrated as members of team 110B and developers 101K and 101L are illustrated as members of team 110K. For ease of illustration, only a limited number of teams 110 and developers 101 are shown in FIG. 1, but techniques and systems described herein may apply to any number of teams 110 with any number of developers 101.

In FIG. 1, each team 110 is assigned to work on one or more projects 105. In the example illustrated in FIG. 1, team 110A is working on project 105A, team 110B is working on project 105B, and in general, team 110K is working on project 105K. Each of developers 101 within a given team 110 may have access to or use one or more computing devices (not specifically shown in FIG. 1) to use during development of projects 105 associated with that team 110. Each of projects 105 may represent an effort to develop software to eventually be deployed and/or executed within data center 120 or elsewhere. In some examples, each of teams 110 may be part of a larger organization, such that each of projects 105 tend to be aligned with the same corporate organizational mission. In such an example, each of teams 110 may communicate with other teams 110 and/or share developers 101. In other examples, however, one or more of teams 110 may be part of different organizations, with little or no communication between teams 110 or sharing of developers 101.

FIG. 1 illustrates a system 100 that includes a number of computing devices and environments in which such computing devices operate. Data center 120 may be a private or public collection of computing systems and/or virtualized computing systems that execute various applications 121A, 121B, and 121N (collectively "applications 121," and representing any number of applications). Such applications 121 may be enterprise applications intended to be used internally within a business, organization, or commercial enterprise. In other examples, some or all of such applications 121 may be public-facing applications that may be available over a public network, such as internet.

Included within data center 120 are a number of network systems 127 (i.e., network systems 127A through 127N). Network systems 127 may include various firewall systems, control systems, security controls, monitoring devices, routers, network hubs, network switches, or any other network equipment or software system. Firewall 126 is illustrated as an example of a network system 127, and may serve as a configurable web application firewall. In some examples, firewall 126 or any of network systems 127 may be configured (e.g., over network 119) to apply security or other policies that adjust, control, or otherwise modify operations of data center 120, systems within data center 120, applications 121 executing on such systems, or other aspects of data center 120.

System 100 includes one or more systems of record 141, HR systems 142, data analysis systems 143, repositories 144, environmental information systems 145, and/or news source systems 146. Such systems are collectively referred to herein as "information systems 140," and such information systems 140 may include other types of systems, not specifically illustrated in FIG. 1 or described herein. Each of information systems 140 may include a respective data store 149, as illustrated in FIG. 1. In general, each of information systems 140 are capable of communicating with other devices or systems within system 100 over network 119.

Network 119 may be any public or private network, and may be the internet. Computing devices associated with or used by members of team 110A may communicate over network 119 through network 115A, which may serve as a gateway to network 119. Similarly, computing devices associated with team 110B may communicate over network 119 through network 115B, and computing devices associated with team 110K may communicate over network 119 through network 115K. Each of networks 115A, 115B, and 115K (collectively "networks 115") may be a private network used within an enterprise or other organization. In other examples, each of networks 115 may be independent private networks not associated with a common enterprise, corporation, or organization.

Computing system 181 represents a collection of systems or computing devices configured to assess application health or to assess factors that may affect the quality of software developed (i.e., one or more of projects 105) within system 100. Computing system 181 in FIG. 1 includes data store 199, which may be used to store current and/or historical information about each of projects 105, along with information about which teams 110 and developers 101 worked on such projects.

In some examples, computing system 181 performs an analysis of software, focusing on human factors associated with the development of software. In general, more competent development teams tend to create more healthy applications, so the identity or makeup of the development team itself might be used to assess the quality of an application. As described herein, a team 110 might be evaluated based on criteria that includes a determination of how often the team 110 introduces vulnerabilities or defects in their code. By assessing whether a development team 110 associated with a given project 105 is of higher or lower quality, predictions about the outcomes resulting from a given project 105 can be made and used for various purposes, such as assessing the health of any of projects 105.

Computing system 181 may also assess the quality or other attributes of one or more applications 121 executing within data center 120. In such an example, applications 121 might already be being used in a production environment, and might not be undergoing active development or revision. Historical information about the developers 101 and/or teams 110 involved in development of a given application 121 can be evaluated and used to make a prediction about the quality, health, or other attributes of the application.

Assessments performed by computing systems 181 about any of development teams 110 could evolve over time, and teams could rehabilitate any low ratings through training, improvement in processes, or through other methods. Computing system 181 may perform follow-up assessments that might be used to determine whether developers or teams are learning from experience, are refraining from making similar errors, and/or addressing issues quicky when identified. Computing system 181 may apply forecasting tools used to determine whether an application has health that is trending positively or negatively, perhaps based on developer team attributes. Computing system 181 may consider other factors beyond developer skills in making assessments, such as team dynamics. For example, computing system 281 may determine that a team 110 that has a high amount of turnover in its members will tend to produce code, software, or other results that are of lower quality than a more stable team.

Computing system 181 may be implemented using any suitable computing system or collection of computing systems, including one or more server computers, workstations, mainframes, appliances, cloud computing systems, and/or other computing devices that may be capable of performing operations and/or functions described in accordance with one or more aspects of the present disclosure. In some examples, such systems may represent or be implemented through one or more virtualized compute instances (e.g., virtual machines, containers) of a data center (e.g., data center 120 or another data center), cloud computing system, server farm, and/or server cluster. Similarly, each of information systems 140 (or other systems illustrated in FIG. 1 or described herein) may similarly be implemented using any suitable computing system, including through virtualized systems in a data center, cloud computing system, server cluster, or otherwise.

In FIG. 1, and in accordance with one or more aspects of the present disclosure, computing system 181 may receive information about one or more of projects 105. For instance, in an example that can be described in the context of FIG. 1, computing system 181 receives, over network 119, a series of signals. Computing system 181 determines that the signals include information about projects 105 being developed by developers 101 working within one or more teams 110. For example, computing system 181 may receive signals originating from network 115A that include information about project 105A. Computing system 181 determines, based on information included within the received signals, that team 110A is working on project 105A, and that team 110A is composed of developers 101A, 101B, 101C, 101D, and 101E. Similarly, computing system 181 may receive signals originating from network 115B that include information about project 105B being developed by developers 101F and 101G within team 110B. And computing system 181 may also receive signals originating from network 115K that include information about project 105K being developed by developers 101K and 101L.

Computing system 181 may receive such signals from networks 115 in response to an earlier request for information by computing system 181. In other examples, computing system 181 may receive such signals sent by teams 110 on their own initiative (e.g., pursuant to a reporting obligation or otherwise).

Computing system 181 may determine and store information about projects 105. For instance, continuing with the example being described in the context of FIG. 1, computing system 181 determines that the received signals include information about the nature of each of projects 105. In one example, computing system 181 determines that project 105A relates to a public-facing web application being developed by team 110A. Computing system 181 may also determine that project 105B relates to an application that will eventually be executing within data center 120, and that will have significant visibility and/or security implications. Accordingly, in such an example, computing system 181 determines that project 105B may present more potential risk exposure than other types of applications. Computing system 181 may also determine that project 105K relates to utility software that will be only used internally within an organization (e.g., within network 115K) and presents less security exposure than other applications. Computing system 181 stores information about each of projects 105 within data store 199.

Computing system 181 may analyze one or more of projects 105 to predict an outcome. For instance, continuing with the example being described in the context of FIG. 1, computing system 181 evaluates information about each of projects 105, and in particular, information about which developers 101 are contributing to the efforts for each of projects 105. In doing so, computing system 181 makes a prediction about one or more outcomes for each of projects 105 based on the developers 101 involved in each of projects 105. For example, computing system 181 may predict, based on historical information about developer 101C and developers 101E, that a specific type of access violation (or other defect) may be present in software developed by team 110A for project 105A. In another example, computing system 181 may predict, based on historical information about developer 101D, that memory utilization requirements for an application developed by team 110A for project 105A will tend to be significant. In another example, computing system 181 may predict, based on historical information about developer 101A, that software developed by team 110A for project 105A is not likely to have any security vulnerabilities or security defects (e.g., developer 101A may be particularly adept at ensuring that any software managed by developer 101A avoids such defects).

Computing system 181 may take action in response to the predicted outcome for any of projects 105. For instance, still continuing with the example in the context of FIG. 1, computing system 181 evaluates the predictions about each of projects 105, including project 105A. Computing system 181 may, for predictions suggesting an unfavorable outcome could result from project 105A, output communications to one or more developers 101 (or to devices operated by such developers 101) within team 110A, suggesting a course of action to address, ameliorate, and/or prevent the predicted unfavorable outcome. Such courses of action may involve scans of software developed for project 105A, proposed code changes, changes to composition of team 110A, education of developers 101 within team 110A, or other actions. Computing system 181 may, for predictions suggesting a favorable outcome should result from project 105A, output communications to stakeholders associated with project 105A, informing them of the status of project 105A.

In addition to projects 105, computing system 181 may analyze one or more applications 121 executing within data center 120. For instance, in another example that can be described in the context of FIG. 1, computing system 181 evaluates information about each of applications 121, and in particular, information about which of developers 101 were involved to the development efforts for each of applications 121. Computing system 181 uses this information to make a prediction about the health of one or more of applications 121. For example, computing system 181 may predict, based on the developers 101 (or team 110) involved in developing application 121A, that application 121A is vulnerable to a specific security defect, or that application 121B might not have been developed following an organization-developed playbook for various protocols (e.g., memory allocation) or a new programming language (e.g., HTML 5), or that application 121N will work better with a specific configuration change to firewall 126.

Computing system 181 may take action in response to the predicted health of any of applications 121. For instance, still continuing with the example, computing system 181 may, based on the predicted health of applications 121, make changes to one or more network systems 127 within data center 120 to enable one or more of applications 121 to function more effectively. Alternatively, or in addition, computing system 181 may, also based on the predicted health of one or more of applications 121, redeploy one or more of applications 121 to systems or virtual machines that are configured with more memory. Alternatively, or in addition, computing system 181 may perform adjustments to firewall 126 to address any security defects implicated by the assessed health of specific applications 121.

In some examples, the actions taken by computing system 181 may be automated and might not require any administrator or human guidance. For example, computing system 181 may automatically make configurations to firewall 126 or any of network systems 127. Such actions may be considered to be "self-healing" actions, at least because they can be performed by computing system 181 to address an issue with one or more of applications 121 (or projects 105) with little or no administrator confirmation, input, or further analysis.

Techniques described herein may provide certain technical advantages. For example, by performing predictive prevention of security flaws, early engagement for issue avoidance, and focused efforts with teams that need it most, risk introduced by security vulnerabilities and otherwise can be reduced. Techniques described herein may streamline application delivery by identifying and reducing security and productivity inhibitors, reducing rework, and reducing the frequency of oversight controls for teams with high application security maturity. Similarly, techniques described herein may optimize program resources by targeting security resources to where the system observed recommendations will cause a timeframe shift in security readiness to an earlier timeframe, enabling better outcomes. Techniques described herein may enable better achievement of strategic goals by accelerating code and feature development, moving timeframes earlier, and expanding a focus on security systems and an organization's adaptive and dynamic core.

Figure 2:
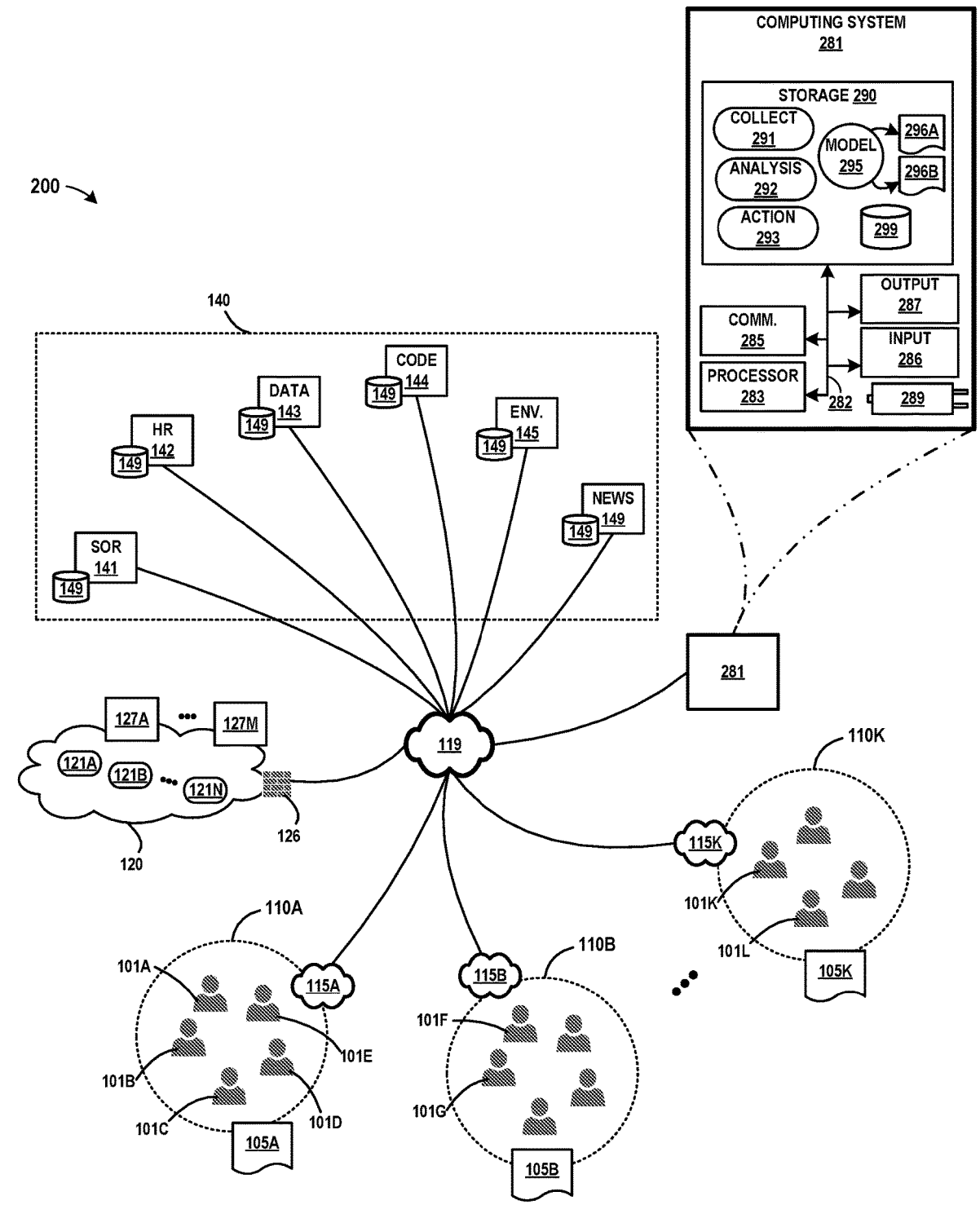
FIG. 2 is a conceptual diagram and block diagram illustrating an example computing system that evaluates the quality of software developed by a development team, in accordance with one or more aspects of the present disclosure.

FIG. 2 is a conceptual diagram and block diagram illustrating an example computing system that evaluates the quality of software developed by a development team, in accordance with one or more aspects of the present disclosure. System 200 of FIG. 2 includes many of the same elements of system 100 of FIG. 1, and in general, like-numbered elements illustrated in FIG. 2 correspond to elements similarly illustrated and numbered in FIG. 1.

FIG. 2 also includes computing system 281, illustrated as a block diagram with specific components and data modules. In examples described in connection with FIG. 2, computing system 281 may correspond to, or may be considered an example or alternative implementation of computing system 181 of FIG. 1. For ease of illustration, computing system 281 is depicted in FIG. 2 as a single computing system. However, in other examples, computing system 281 may comprise multiple devices or systems, such as systems distributed across a data center or multiple data centers. For example, separate computing systems may implement functionality performed by each of collection module 291, analysis module 292, and action module 293, described below. Alternatively, or in addition, computing system 281 (or various modules illustrated in FIG. 2 as included within computing system 281) may be implemented through distributed virtualized compute instances (e.g., virtual machines, containers) of a data center, cloud computing system, server farm, and/or server cluster.

In FIG. 2, computing system 281 is illustrated as including underlying physical hardware that includes power source 289, one or more processors 283, one or more communication units 285, one or more input devices 286, one or more output devices 287, and one or more storage devices 290. Storage devices 290 may include collection module 291, analysis module 292, and action module 293. One or more of the devices, modules, storage areas, or other components of computing system 281 may be interconnected to enable inter-component communications (physically, communicatively, and/or operatively). In some examples, such connectivity may be provided by through communication channels, which may include a system bus (e.g., communication channel 282), a network connection, an inter-process communication data structure, or any other method for communicating data.

Power source 289 of computing system 281 may provide power to one or more components of computing system 281. One or more processors 283 of computing system 281 may implement functionality and/or execute instructions associated with computing system 281 or associated with one or more modules illustrated herein and/or described below. One or more processors 283 may be, may be part of, and/or may include processing circuitry that performs operations in accordance with one or more aspects of the present disclosure. One or more communication units 285 of computing system 281 may communicate with devices external to computing system 281 by transmitting and/or receiving data, and may operate, in some respects, as both an input device and an output device. In some or all cases, communication unit 285 may communicate with other devices or computing systems over network 105 or over other networks.

One or more input devices 286 may represent any input devices of computing system 281 not otherwise separately described herein, and one or more output devices 287 may represent any output devices of computing system 281 not otherwise separately described herein. Input devices 286 and/or output devices 287 may generate, receive, and/or process output from any type of device capable of outputting information to a human or machine. For example, one or more input devices 286 may generate, receive, and/or process input in the form of electrical, physical, audio, image, and/or visual input (e.g., peripheral device, keyboard, microphone, camera). Correspondingly, one or more output devices 287 may generate, receive, and/or process output in the form of electrical and/or physical output (e.g., peripheral device, actuator).

One or more storage devices 290 within computing system 281 may store information for processing during operation of computing system 281. Storage devices 290 may store program instructions and/or data associated with one or more of the modules described in accordance with one or more aspects of this disclosure. One or more processors 283 and one or more storage devices 290 may provide an operating environment or platform for such modules, which may be implemented as software, but may in some examples include any combination of hardware, firmware, and software. One or more processors 283 may execute instructions and one or more storage devices 290 may store instructions and/or data of one or more modules. The combination of processors 283 and storage devices 290 may retrieve, store, and/or execute the instructions and/or data of one or more applications, modules, or software. Processors 283 and/or storage devices 290 may also be operably coupled to one or more other software and/or hardware components, including, but not limited to, one or more of the components of computing system 281 and/or one or more devices or systems illustrated or described as being connected to computing system 281.

Data store 299 of computing system 281 may represent any suitable data structure or storage medium for storing information relating information about developers 101, information about current and past projects 105, and information collected from information systems 140, and other information used during operation of computing system 281. The information stored in data store 299 may be searchable and/or categorized such that one or more modules within computing system 281 may provide an input requesting information from data store 299, and in response to the input, receive information stored within data store 299. Data store 299 may be primarily maintained by collection module 291.

Collection module 291 may perform functions relating to collecting (e.g., from information systems 140 or otherwise) information about projects 105, developers 101, applications 121, and other topics. Analysis module 292 may perform functions relating to making assessments of factors that may affect the quality of software performed by developers 101 and/or teams 110. In some examples, analysis module 292 may train and/or apply model 295 to evaluate information included within data store 299 and assess software quality or make a prediction about software quality. Action module 293 may perform functions relating to acting on assessments, which may include making adjustments to applications 121 executing within data center 120, making adjustments to one or more firewalls 126, any of network systems 127, and/or performing other operations.

In operation, and in accordance with one or more aspects of the present disclosure, computing system 281 may request information from information systems 140. For instance, in an example that can be described in the context of FIG. 2, collection module 291 of computing system 281 causes communication unit 285 to output a series of signals over network 119. One or more of information systems 140 detect the signals and determine that the signals correspond to requests for information. For example, system of record 141 may receive, over network 119, signals from computing system 281 that include a request for information about an enterprise. In some cases, the requested information may be information maintained by an enterprise or organization in an authoritative data source (e.g., data store 149 associated with system of record 141) relating to business operations, policies, initiatives, and/or plans relating to deployment of applications 121 within data center 120 or relating to development of one or more projects 105.

In another example, HR system 142 may receive, over network 119, signals from computing system 281 that include requests for information about one or more developers 101 (as part of one of teams 110) that may be developing one or more of projects 105 as employees of an organization. Such information may include information about a department, team, and/or line of business membership or affiliation for any of developers 101, length of employment for any of developers 101, educational background, training, or experience of any of developers 101, or other information. In addition, HR system 142 may store information about technical and/or managerial leads in each of teams 110, developer tenure in each of teams 110, and an indication of the extent to which any of teams 110 is experiencing high or low developer turnover or other team issues that may affect stability of any of teams 110.

Data analysis system 143 may receive signals that include request for machine-generated data collected or maintained by systems used to for operations within a commercial enterprise, business, or organization. Data analysis system 143 may represent any system or collection of systems that maintains and/or is capable of processing, analyzing, and/or organizing machine-generated data. In some examples, data analysis system 143 may include information about past development including team members, development techniques, and resulting source code. Such information may also include information about projects and any failures, defects, or successes of projects undertaken by any of teams 110. In some examples, one or more data analysis systems 143 may be a vulnerability resolution platform that provides a window into the state of application security programs for organizations that build software. Such a system may help organizations aggregate vulnerability data, generate virtual patches, and interact with software defect tracking systems.

Repository 144 may receive signals that include a request for code or information about code stored within a code repository. In some cases, the code that may have been written or contributed by one or more developers 101 or by a third party developer. Code maintained by repository 144 may be stored in a publicly-accessible version control system, such as Git. Alternatively, or in addition, code maintained by repository 144 may be stored in a private version control system that is not available to the public.

Environmental information system 145 may receive signals that include requests for environmental information. Such environmental information may relate to weather information that may impact efforts by any of teams 110 in developing any of projects 105 (e.g., actual or threatened weather events, which may include hurricanes, tornadoes, tsunamis, wildfires, heat or cold waves, or other weather events). Environmental information may also relate to information about air quality, public health crises, or conditions that may impact governmental or political stability or public safety in a region in which any of teams 110 or developers 101 may operate.

News source system 146 may receive signals that include a request for information about news events. Such information may include published news reporting about business competitors, business partners, developers 101, or other entities or people that may be involved in some way in operations of any of teams 110, one or more applications 121, or in ongoing development of one or more projects 105.

Each of information systems 140 may respond to the requests for information from computing system 181. For instance, continuing with the example being described in the context of FIG. 2, and in in each case in which information is available from one or more of information systems 140 (e.g., one or more of system of record 141, HR system 142, data analysis system 143, repository 144, and environmental information system 145), each such information system 140 accesses a respective data store 149, and outputs a signal over network 119. Communication unit 285 of computing system 281 detects one or more signals and outputs information about the signal(s) to collection module 291. Collection module 291 determines that the signals include information from one or more of information systems 140.

Computing system 281 may store correlated data derived from information systems 140. For instance, again with reference to FIG. 2, collection module 291 correlates information received from information systems 140 with the identity of one or more developers 101 or one or more of teams 110. For example, collection module 291 correlates code (or information about code) that collection module 291 receives from repository 144 to the developers 101, team 110, or teams 110 that wrote the code. Collection module 291 may also correlate information with any applications 121 that may use the code or with any of projects 105 that may rely on the code. Alternatively, or in addition, collection module 291 correlates other information, such as news information (e.g., received from news source system 146) to one or more or more projects 105 that may be affected by the news. In some cases, such news information may indicate that a new government regulation may affect a specific project 105, or a change in a third party software API used by code included within one of the projects 105 may have impacts on a specific project 105.

Computing system 281 may analyze collected information for each of developers 101. For instance, referring again to FIG. 2, analysis module 292 queries data store 299 for information about each of developers 101. Analysis module 292 receives information about historical and/or current projects 105 in which each developer 101 was involved. Such projects may be ongoing projects currently under development, such projects may be projects in which a production version of software is executing within data center 120 (e.g., any of applications 121), or such projects may be projects that were abandoned without having been placed into production. Analysis module 292 evaluates the information, and uses the information to make an assessment about or evaluation of the quality of source code, software, or other contributions by each of developers 101. To perform such an assessment or evaluation, analysis module 292 may apply scans to code written by each developer 101 to check for defects (memory or other resource usage scans, security scans, scans for logical or other defects, scans for coding style compliance, or otherwise). Alternatively, or in addition, analysis module 292 may evaluate code written by each developer to check for compliance with any development guidelines that should have been applied (e.g., best practices guidelines) when writing software, use of development playbooks that should have been used during development, compliance with scheduling goals, compliance with policies for use of third party software tools or open source code, and/or compliance with corporate governance policies. Analysis module 292 uses the information to generate a score or evaluation for each of developers 101.

Computing system 281 may analyze collected information for each of teams 110. For instance, referring to the example being described in the context of FIG. 2, analysis module 292 queries data store 299 for information correlated to each of teams 110, such as team 110A. Analysis module 292 receives information about project 105A and/or historical projects developed by team 110A. Analysis module 292 evaluates the information to make an assessment about or evaluation of about the quality of source code, software, or other aspects of projects developed by team 110A. To perform such an evaluation, analysis module 292 may apply scans to code written by any member of team 110A to evaluate attributes described above with respect to individual developers. Analysis module 292 uses the information to generate a score or evaluation for team 110A. Analysis module 292 engages in a similar process to generate a score of evaluation for each of the other teams 110 (e.g., teams 110B to 110K).

Computing system 281 may create a model to predict information about one or more projects 105 or one or more applications 121. For instance, again with reference to FIG. 2, analysis module 292 creates model 295 to predict, based on the evaluations of developers 101 and teams 110, the quality of applications 121 already executing within data center 120, or to predict the quality and other attributes of software that may result from any of projects 105. In some examples, model 295 may use information about each of teams 110 or the composition of developers 101 within each team 110 to make a prediction about the timeliness with which a given project 105 will be completed, the security vulnerabilities that may be included within software resulting from the project 105, the reliability of the software resulting from the project 105, and other attributes of the software resulting from a given project 105. Analysis module 292 may use information about other factors that might affect the productivity of a given team 110. In some cases, such factors might be human resource related (e.g., lots of turnover within a given team 110), data-related (e.g., an internal or external system that a given team 110 uses is known to be unreliable), environmentally-related (e.g., a weather event is impacting at least some developers 101 within a given team 110). In general, such factors might include any stressors that may affect the ability of a given team 110 to function efficient. Such factors might also include any factors that tend to help the team operate more efficiently (e.g., access to more modern or reliable equipment, less regulatory or organizational controls, more autonomy, or other factors).

In some examples, computing system 281 may train a machine learning model to predict information about projects 105 and/or applications 121. For instance, referring again to FIG. 2, analysis module 292 may use data stored within data store 299 to generate training data that includes information about developer and team attributes, along with environmental or other factors that may affect the efficiently or productivity of a given developer 101 or team 110. Analysis module 292 may use historical information about successes and failures of prior development projects to label the training data as being associated with either a positive or negative result or outcome. In some cases, analysis module 292 may label the training data with a score that represents a continuum of favorable to unfavorable outcomes. Analysis module 292 uses the labeled training data to train a machine learning model or neural network (i.e., model 295) to make predictions about the expected outcome of a project 105 based input specifying the developers 101 and/or team 110 working on the project 105. In some cases, model 295 may predict information outcomes that pertain to software quality, health, potential vulnerabilities, development timeliness, and other attributes of software resulting from the project. Model 295 may also be used to predict attributes of application 121 that may already be in production within data center 120, where such predictions are made by model 295 using information about the composition of the team 110 that developed a given application 121.

Computing system 281 may apply model 295 to evaluate one or more of projects 105. For instance, still referring to FIG. 2, analysis module 292 accesses information withing data store 299 about a specific project 105 being developed, such as project 105A. Analysis module 292 uses the accessed information to determine that team 110A (made up of developers 101A, 101B, 101C, 101D, and 101E) are assigned to project 105A. Analysis module 292 generates a project data set that includes information about project 105A and the team 110A working on project 105A. The project data set may also include other information relevant to project 105A, such as any environmental factors, stressors, or other information that may affect productivity of team 110A (or any of its developers 101) when working on project 105A. Analysis module 292 applies model 295 to the project data set to generate prediction 296A pertaining to project 105A. In some examples, prediction 296A indicates an expected outcome of project 105A, which may be expressed as a score representing favorable to unfavorable outcomes. Alternatively, or in addition, prediction 296A indicates specific information about project 105A, such as information about potential or expected software vulnerabilities or defects, project timelines (e.g., team 110A is being too optimistic about its development schedule), expected health of an application that will result from project 105A, expected resources required to complete project 105A, expected computing resources that software resulting from project 105A will consume in data center 120, and/or other attributes of project 105A.

Computing system 281 may take one or more actions in response to applying model 295 to project 105A. For instance, still continuing with the example being described with reference to FIG. 2, analysis module 292 outputs to action module 293 information about prediction 296A. Action module 293 evaluates prediction 296A and determines one or more actions to take to improve the expected outcome associated with project 105A. In some examples, action module 293 causes computing system 281 to communicate with HR system 142 to schedule training sessions for one or more of developers 101 working on project 105A, where such training sessions are designed to address any vulnerability or defects identified by model 295 and reported in prediction 296A. In some examples, action module 293 may cause computing system 281 to communicate with HR system 142 to adjust the staffing associated with project 105A, perhaps moving additional developers 101 to team 110A, or replacing one or more underperforming developers 101 with other developers 101. HR system 142 may reassign such underperforming developers 101 to a different team 110 and/or different project 105 where such developers 101 may be more successful. In another example, action module 293 may communicate information to management of an organization overseeing project 105A, providing information about favorable and/or unfavorable predicted outcomes for project 105A. In some examples, action module 293 may, based on the reputation of team 110A, interact with one or more of information systems 140 to reduce or eliminate validations steps that may otherwise be required during development of project 105A, thereby providing team 110A with more autonomy and freedom to develop project 105A as team 110A deems appropriate. In some examples, action module 293 may interact with other information systems 140 to address any issues, environmental or otherwise, that may affect the outcome of project 105A. In general, action module 293 chooses such actions, based on the predicted outcome of project 105A as indicated by prediction 296A, in order improve the actual outcome of project 105A.

Computing system 281 may also apply model 295 to one or more of applications 121. For example, still referring to the example being described in FIG. 2, analysis module 292 accesses information within data store 299 about an application 121 executing within data center 120, such as application 121B. Analysis module 292 uses the accessed information to determine that team 110B developed application 121B. Analysis module 292 further uses the accessed information to determine that developers 101F and 101G participated in development of application 121B by team 110B. Analysis module 292 uses the information about team 110B and the developers involved in developing application 121B for team 110B to generate an application data set associated with application 121B. Analysis module 292 applies model 295 to the application data set to generate prediction 296B. In the example being described, prediction 296B provides an assessment of application 121B, in terms of software quality, health, potential vulnerabilities, development timeliness, and/or other attributes of application 121B. In some examples, prediction 296B may identify a specific security vulnerability associated with application 121B. In the example being described, that vulnerability tends to arise in applications developed by team 110B, at least based on the data used to train model 295.

Computing system 281 may take one or more actions in response to applying model 295 to application 121B. For instance, referring again to the example being described in the context of FIG. 2, analysis module 292 outputs to action module 293 information about prediction 296B generated by model 295. Action module 293 determines that the information indicates that application 121B has one or more security vulnerabilities. Action module 293 generates a plan to address the security vulnerability. Action module 293 causes communication unit 285 of computing system 281 to output signals over network 119. Firewall 126 or one or more of network systems 127 detect the signals. In one example, firewall 126 determines that the signals describe configurations to be applied to firewall 126 (i.e., to address the security vulnerability associated with application 121B). Firewall 126 applies the described configurations, thereby addressing, ameliorating, or eliminating the security vulnerability associated with application 121B. In other examples, 293 may (alternatively, or in addition) implement security controls within data center 120 to address the security vulnerability introduced by application 121B.

In some examples, prediction 296A and/or prediction 296B (or predictions 296 generally) may represent or include a score that provides an indication of the health of an application or project. In such an example, health scores can be used to assess the health of an application, or to assess the health of a portfolio of applications, where health scores are calculated for each application in the portfolio of applications.

Modules illustrated in FIG. 2 (e.g., collection module 291, analysis module 292, action module 293, model 295) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Figure 3:
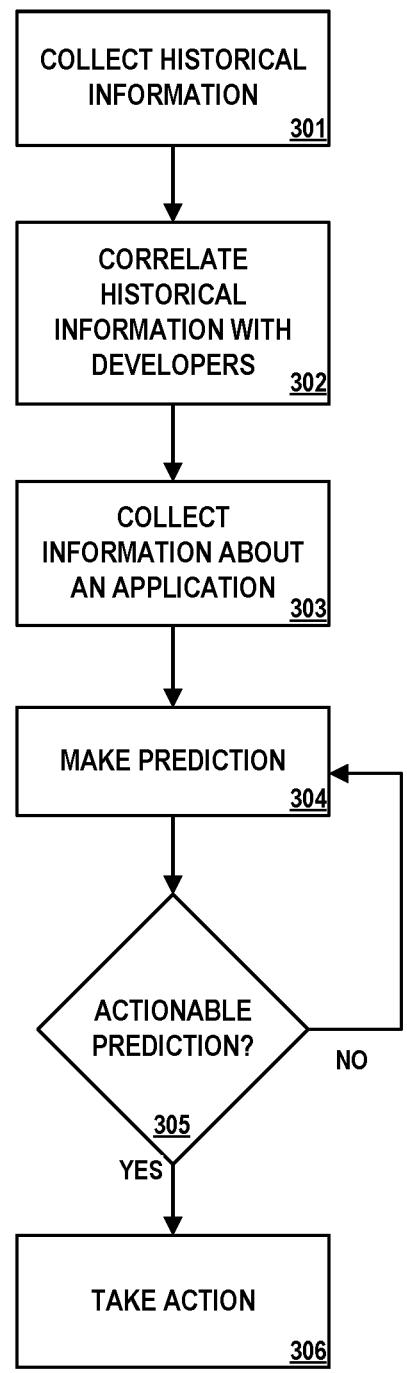
FIG. 3 is a flow diagram illustrating operations performed by an example computing system in accordance with one or more aspects of the present disclosure.

FIG. 3 is a flow diagram illustrating operations performed by an example computing system in accordance with one or more aspects of the present disclosure. FIG. 3 is described below within the context of computing system 181 of FIG. 1. In other examples, operations described in FIG. 3 may be performed by one or more other components, modules, systems, or devices. Further, in other examples, operations described in connection with FIG. 4 may be merged, performed in a difference sequence, omitted, or may encompass additional operations not specifically illustrated or described.

In the process illustrated in FIG. 3, and in accordance with one or more aspects of the present disclosure, computing system 181 may collect historical information (301). For example, with reference to FIG. 1, computing system 181 outputs signals to one or more of information systems 140. In response, computing system 181 receives information about prior projects 105 developed within system 100. In some examples, the information about prior projects 105 includes information about an outcome of such projects (e.g., whether the project completed successfully and if so, the degree of success).

Computing system 181 may correlate the historical information with developers (302). For example, computing system 181 analyzes the received information to determine which of developers 101 and/or which of teams 110 worked on prior projects 105. Computing system 181 determines the identity of each of developers 101 that worked on each prior project 105. Computing system 181 stores the correlated information within data store 199.

Computing system 181 may collect information about an application (303). For example, computing system 181 collects information about one or more current projects 105. To do so, computing system 181 may collect information from one or more of information systems 140. Alternatively, or in addition, computing system 181 may collect information maintained by any of teams 110 about current projects 105, and may access such information over a corresponding network 115.

Computing system 181 may make a prediction (304). For example, computing system 181 uses the information collected about prior projects 105 and information about outcomes for such prior projects 105 to create a training data set, where the training set includes a set of attributes of the prior project labeled with an outcome. Using the training set, computing system 181 trains a machine learning model to predict an outcome based on attributes of a current project. Accordingly, computing system 181 may apply the machine learning model to the information collected about one or more current projects 105 to generate a prediction. In some cases, the prediction is an actionable prediction (YES path from 305), such as one that identifies a security vulnerability or other condition that may require remediation. In other cases, the prediction might not necessarily be actionable (NO path from 305), and may merely indicate that a given project 105 is progressing according to plan.

Computing system 181 may take action (306). For example, for an actionable prediction, such as one involving a security defect, computing system 181 may act on the prediction, such as by communicating with one or more developers 101, providing information identifying the predicted security defect. In another example, computing system 181 may communicate with HR system 142 to make adjustments to the composition of one or more teams 110. Where the application is executing within data center 120, computing system 181 may also interact with, make configurations changes to, and/or control one or more of network systems 127 within data center 120 to counter the security defect, thereby preventing any unfavorable outcome that might result from the defect.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The disclosures of all publications, patents, and patent applications referred to herein are hereby incorporated by reference. To the extent that any such disclosure material that is incorporated by reference conflicts with the present disclosure, the present disclosure shall control.

For ease of illustration, only a limited number of devices or systems (e.g., computing system 181, information systems 140, computing system 281, networks 115, networks 119, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated herein as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, or optical disk storage, magnetic disk storage, or other magnetic storage devices, flash memory, or any other medium that can be used to store desired program code in the form of instructions or data structures and that can be accessed by a computer. Also, any connection may properly be termed a computer-readable medium. For example, if instructions are transmitted from a website, server, or other remote source using a wired (e.g., coaxial cable, fiber optic cable, twisted pair) or wireless (e.g., infrared, radio, and microwave) connection, then the wired or wireless connection is included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
    collecting, by a computing system, historical information about a plurality of prior development projects;
    correlating, by the computing system, the historical information with each of a plurality of developers that participated in one or more of the plurality of prior development projects;
    collecting, by the computing system, information about an application developed by a subset of the plurality of developers;
    generating, by the computing system and based on the information about the application and the correlated historical information, a predicted outcome for the application; and
    taking an action, by the computing system and based on the predicted outcome, to prevent the predicted outcome, wherein taking the action includes communicating with a network system and configuring a web application firewall to prevent the predicted outcome.

2. The method of claim 1, wherein the historical information includes at least one of:
    information about reliability of an application resulting from at least one of the prior development projects;
    information about a defect that was present in an application resulting from at least one of the prior development projects;
    information about a security vulnerability that was present in an application resulting from at least one of the prior development projects; or
    results from scans of source code created during at least one of the prior development projects.

3. The method of claim 1, wherein correlating the historical information includes:
    identifying source code written during development of each of the prior development projects.

4. The method of claim 3, wherein correlating the historical information further includes:
    identifying portions of the source code written by each member of the prior development projects.

5. The method of claim 1, wherein collecting information about the application includes:
    performing an assessment of each of the developers in the subset of the plurality of developers.

6. The method of claim 1, wherein collecting information about the application includes:
    collecting information about an application still being developed.

7. The method of claim 1, wherein collecting information about the application includes:
    collecting information about an application that is deployed in a production environment.

8. The method of claim 1, wherein generating the predicted outcome includes:
    creating a training set of data based on the historical information about the plurality of prior development projects, wherein the training set identifies each developer that participated in each of the prior development projects; and training a machine learning model, based on the training set of data, to generate the predicted outcome based on identities of developers in the subset of the plurality of developers.

9. The method of claim 8, wherein creating the training set of data includes:
labeling instances of project training data with an outcome associated with each of the prior development projects; and
correlating each developer with the labeled instances of project training data corresponding to projects in which the developer participated.

10. The method of claim 1, wherein generating the predicted outcome includes predicting at least one of:
a defect in an application in development;
a defect in an application deployed in production;
a security vulnerability in an application in development;
a security vulnerability in an application deployed in production;
a corporate governance violation in an application in development; or
a corporate governance violation in an application deployed in production.

11. The method of claim 1, wherein taking the action includes:
identifying a developer in the subset of developers that wrote source code on which the predicted outcome is based; and
initiating an educational process for the identified developer.

12. The method of claim 1, wherein taking the action includes:
identifying a developer in the subset of developers that wrote source code on which the predicted outcome is based; and
adjusting the subset of developers to exclude the identified developer.

13. A computing system comprising processing circuitry and a storage device, wherein the processing circuitry has access to the storage device and is configured to:
collect historical information about a plurality of prior development projects;
correlate the historical information with each of a plurality of developers that participated in one or more of the plurality of prior development projects;
collect information about an application developed by a subset of the plurality of developers;
generate, based on the information about the application and the correlated historical information, a predicted outcome for the application, wherein to generate the predicted outcome, the processing circuitry is configured to:
create a training set of data based on the historical information about the plurality of prior development projects, wherein the training set identifies each developer that participated in each of the prior development projects, and train a machine learning model, based on the training set of data, to generate the predicted outcome based on identities of developers in the subset of the plurality of developers; and
take an action, based on the predicted outcome, to prevent the predicted outcome.

14. The computing system of claim 13, wherein the historical information includes at least one of:
information about reliability of an application resulting from at least one of the prior development projects;
information about a defect that was present in an application resulting from at least one of the prior development projects;
information about a security vulnerability that was present in an application resulting from at least one of the prior development projects; or
results from scans of source code created during at least one of the prior development projects.

15. The computing system of claim 13, wherein to correlate the historical information, the processing circuitry is further configured to:
identify source code written during development of each of the prior development projects.

16. The computing system of claim 15, wherein to correlate the historical information, the processing circuitry is further configured to:
identify portions of the source code written by each member of the prior development projects.

17. The computing system of claim 13, wherein to correlate information about the application, the processing circuitry is further configured to:
perform an assessment of each of the developers in the subset of the plurality of developers.

18. A non-transitory computer-readable medium comprising instructions that, when executed, configure processing circuitry of a computing system to:
collect historical information about a plurality of prior development projects;
correlate the historical information with each of a plurality of developers that participated in one or more of the plurality of prior development projects;
collect information about an application developed by a subset of the plurality of developers;
generate, based on the information about the application and the correlated historical information, a predicted outcome for the application; and
take an action, based on the predicted outcome, to prevent the predicted outcome, wherein the instructions that cause the processing circuitry to take an action further include instructions that, when executed, cause the processing circuitry to communicate with a network system and configure a web application firewall to prevent the predicted outcome.

* * * * *